(12) United States Patent
Campbell

(10) Patent No.: US 7,707,007 B2
(45) Date of Patent: Apr. 27, 2010

(54) AUTONOMIC CLIENT MIGRATION SYSTEM FOR SERVICE ENGAGEMENTS

(75) Inventor: Christopher S. Campbell, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 1670 days.

(21) Appl. No.: 10/902,601

(22) Filed: Jul. 30, 2004

(65) Prior Publication Data

US 2006/0026012 A1 Feb. 2, 2006

(51) Int. Cl.
*G06F 15/00* (2006.01)

(52) U.S. Cl. ............... 702/182; 717/135; 717/137; 717/172; 707/202; 707/204

(58) Field of Classification Search ............ 717/169, 717/172, 175, 177, 168, 137, 174, 173, 135; 705/59, 51, 26; 707/10, 202
See application file for complete search history.

(56) References Cited

U.S. PATENT DOCUMENTS

| | | | |
|---|---|---|---|
| 6,182,212 B1 | 1/2001 | Atkins et al. | 713/1 |
| 6,269,382 B1 * | 7/2001 | Cabrera et al. | 707/204 |
| 6,334,215 B1 * | 12/2001 | Barker et al. | 717/167 |
| 6,546,404 B1 * | 4/2003 | Davis et al. | 707/204 |
| 6,978,259 B1 * | 12/2005 | Anderson et al. | 706/19 |
| 7,117,486 B2 * | 10/2006 | Wong et al. | 717/141 |
| 2002/0087962 A1 * | 7/2002 | Hudson et al. | 717/172 |
| 2002/0178233 A1 * | 11/2002 | Mastrianni et al. | 709/217 |
| 2004/0068715 A1 * | 4/2004 | Wong et al. | 717/136 |

OTHER PUBLICATIONS

"A Mechanism for Supporting Client Migration in a Shared Window System;" Chung et al.; *UIST '96*; 1996; pp. 11-20.
"Personality Tranxport Professional;" Tranxition Corporation; http://www.tranxition.com/ptpto.shtml, 2004.
"Process Migration;" Milojičić et al.; *ACM Computing Surveys*; vol. 32, No. 3; Sep. 2000; pp. 241-299.

* cited by examiner

*Primary Examiner*—Carol S Tsai
(74) *Attorney, Agent, or Firm*—IP Authority, LLC; Ramraj Soundararajan

(57) ABSTRACT

A system and method for the automated capture and analysis of data associated with a pilot deployment of client migration is provided. In an initial phase, software specified by a migration plan is deployed to a subset of a target set of client machines. Data from users interacting with client machines in the client migration pilot process is monitored and data corresponding to expected functions is captured in real-time. Captured interaction data is subsequently analyzed with respect to a baseline of expected user interactions for the migrated software system, to determine the existence of difficulty in interacting with a new software system. If difficulty is indeed detected, either the migration plan or current service offerings are adjusted to meet users' expectations. Adjustments and modifications made are dependent on whether determined user difficulties are categorized as isolated or widespread. Data captured from multiple client migration engagements is further analyzed for strategic decisions.

46 Claims, 3 Drawing Sheets

DETAILED EXECUTION OF MIGRATION PLAN

DETAILED PROCESS FEEDBACK MECHANISM

AUTONOMIC CLIENT MIGRATION SYSTEM FOR SERVICE ENGAGEMENTS

BACKGROUND OF THE INVENTION

1. Field of Invention

The present invention relates generally to the field of migrating software systems. More specifically, the present invention is related to migration plans refined based on analysis of captured feedback.

2. Discussion of Prior Art

Client migration is the process of moving end-user computers from one configuration to another configuration, in which configuration refers to an Operating System (OS) and associated applications that function in that OS environment. In addition, client migration refers to changing from a current OS and applications installed on a client machine to a new OS and applications (e.g., from Windows XP to Suse Linux). The term migration has also been used to mean, more generally, a change from an old configuration to a new one. Thus, migration can also mean moving the same OS, applications, and data from one client machine to another client machine. It can also make reference to upgrading an OS and optionally, applications associated with an OS, from an older to a newer version on a single client machine. It has also been used to refer to moving data from a client machine to a server machine and from a server machine to another server machine.

In one scenario, a migration plan has been defined as a list of software components, applications, and operating systems to be deployed, the manner in which these software components, applications, and operating systems are grouped together and the manner in which they are to be deployed, and a timeline associated with their deployment. Particular groupings of software components, applications, and operating systems are known as images. Images are tested and adjusted in a pilot process, and subsequently, are recorded to a storage medium. During a full-scale deployment, the recorded image is copied to target machines.

The client migration service can be decomposed into the following steps: assessing a target enterprise, creating a customized migration plan, deploying the migration plan, and providing support services for the deployment process. In an initial enterprise assessment, company information is collected to craft a migration solution and associated cost of migration. Relevant information including current technology infrastructure (e.g., number of client computers, currently installed OS, other applications and software) is subsequently processed to create a migration plan comprising: pre-installed configurations on a test computer (i.e., images) to be deployed on target client machines; and an associated timeline for deployment.

As the migration plan is initially deployed in pilot process, images are copied onto a subset of the target set of client machines to determine and plan for effects of a full-scale deployment. If problems are encountered during the pilot process, then adjustments are made to the migration plan, new images are created, and another pilot is performed. When a pilot process eventually results in a satisfactory migration, a full-scale deployment is performed. As accounted for by the pilot process, problems can occur at each step in creation of a migration plan. For example, inaccurate data may be collected during assessment, data may be collected from an inappropriate source, and necessary, relevant data may not be collected at all. In the absence of sufficient and accurate data for characterizing an enterprise, the possibility of creating an inefficient and problematic migration plan increases. Likewise, the chance of a successful, full-scale deployment decreases.

In addition to difficulties in assessment, applications associated with a new OS are not entirely equivalent in function and form (e.g., user interface). For example, when migrating an enterprise having a target set of client machines upon which a Windows OS is installed to a RedHat Linux OS, it is also necessary to migrate the word processing application Microsoft Word to OpenOffice™, since OpenOffice™ is a word processing application associated with a Linux OS. Despite the fact that OpenOffice™ was created to be interoperable with Microsoft Word, there still exist differences in functionality as well as differences in the look and feel of each respective user interface. For example, Microsoft Word users utilizing a macro programming function would have not equivalent functionality in OpenOffice™. More specifically, all macros created in Microsoft Word to perform standard business processes would not be usable in OpenOffice™. If such a migration plan were to be deployed, functionality would therefore be lost and business processes would be interrupted.

User difficulty in interacting with a new system is commonly used as an indication of lack of skill or experience on the part of the user with respect to new software components, applications, or operating system or as an indication that the user does not know how to execute his or her job function using components of the new system. In the latter case, user difficulty implies that a business process or workflow either cannot be performed or cannot be efficiently performed with the new system.

A current approach to addressing such difficulties is to perform a manual pilot in which a number of consultants and technical personnel deploy an initial migration plan for a subset of target client machines, and closely monitor the subset of machines for problems. Any problems noted are then used to adjust a migration plan such that the same problem does not occur during a full-scale deployment. However, such an approach is very expensive and time consuming due to costs incurred through the labor needed from consultants manually executing such a planned migration, and through the questioning of employees about any problems or difficulties with the new applications. Furthermore, a manual deployment is inaccurate because only a subset of employees is questioned and the timeframe for pilot assessment is limited, thus limiting the examination of functionality in the newly migrated applications and period of adjustment to a migration plan.

Recent work on automatic migration systems as disclosed by Atkins et al. in U.S. Pat. No. 6,182,212 "Method and System for Automated Migration of User Settings to a Replacement Computer System" details a system that moves an OS and associated application settings for a particular user from one client machine to another. However, a migration plan is not explicitly generated and furthermore, Atkins teaches a system in which software is pre-loaded. U.S. patent application publication 2002/0178233A1, also disclosed by Atkins et al., "Method and Apparatus for the Automatic Migration of Applications and their Associated Data and Configuration Files," describes the migration of applications, settings, and data from one computer to another computer. Atkins et al. teaches a system requiring the use of metadata for describing how applications are to be associated with files, and also containing settings and data necessary to perform the installation of software on the new computer. Both of these approaches, however, are limited in their consideration of client migration as an enterprise engagement process and are therefore limited in their treatment of cost, risk, and feasibility issues.

Whatever the precise merits, features, and advantages of the above cited references, none of them achieves or fulfills the purposes of the present invention.

SUMMARY OF THE INVENTION

The system and method of present invention provides for the automated capture and analysis of data associated with a pilot deployment of client migration. In an initial phase, a migration plan is deployed in a pilot process to a subset of a target set of client machines. Data from users interacting with a subset of target client machines to which a migration plan is deployed in a pilot process are monitored and data corresponding to expected functions are captured in real-time. Captured interaction data are subsequently analyzed with respect to a baseline of user interactions expected for a migrated software system, in order to determine the existence of difficulty in interacting with a new software system. Such analysis qualitatively determines not only disparities with respect to expected user interactions, but also enables the formulation of a qualitative degree of anomaly. For each determined disparity, captured data are aggregated by factors including, but not limited to: software component, application, or OS type and also by function performed; based on aggregates formed, disparities are categorized as either: an isolated user difficulty or a widespread user difficulty.

If difficulty is indeed detected, either migration plan or current service offerings are adjusted to meet users' expectations. Modifications to a migration plan comprise replacing any of: software components, applications, and operating systems, either in part or in total, to determine a new image for deployment in a pilot process; adding any of: software components, applications, and operating systems, to determine a new image for deployment in a pilot process; and opting to copy an existing image or set of images, in part, to said target set of client machines, in a pilot process. Adjustments to current service offerings are comprised of customizing existing service offerings and adding new service offerings, for example: online documentation, interactive online training, live interaction with technical support personnel, and live training. Adjustments and modifications made are dependent on whether determined user difficulties are categorized as isolated or widespread.

In one embodiment, data captured from multiple client migration engagements are further analyzed for strategic decisions.

DESCRIPTION OF THE PREFERRED EMBODIMENTS

Figure 1:
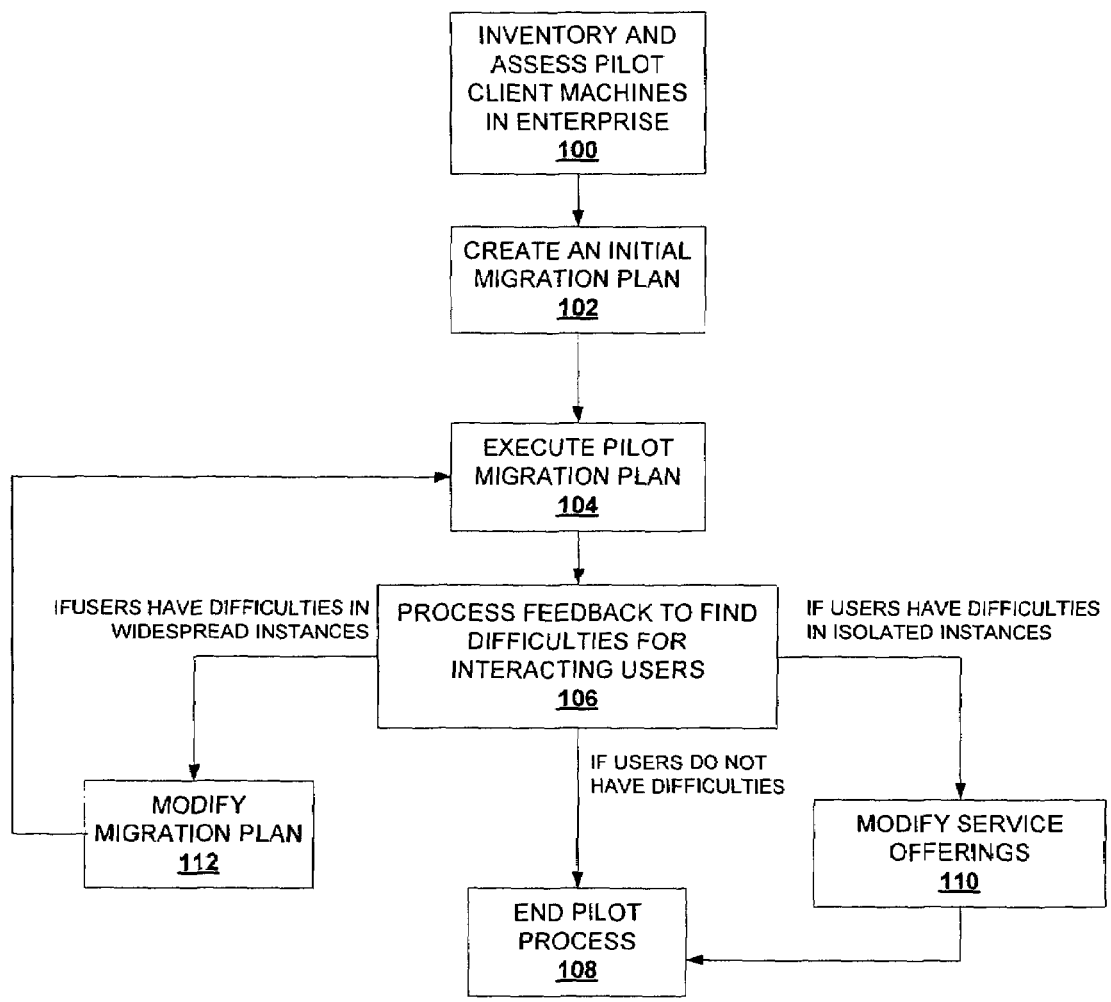
FIG. 1 illustrates a migration plan for the present invention.

While this invention is illustrated and described with respect to a preferred embodiment, the invention may be produced in many different configurations. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

Referring now to FIG. 1, a general method for client migration using an autonomic system is shown. In step 100, an enterprise is assessed by collecting key data from technical administrators and management, as well as by taking an inventory of software applications and hardware components located on client machines. Inventory data are collected, and a migration plan is automatically formulated in step 102. In step 104, the migration plan automatically formulated in step 102 is executed in a pilot process. Subsequently, in step 106, feedback from the pilot migration plan is processed to determine difficulties in interacting with a migrated system. More specifically, the system monitors a user's interaction with programs, applications, and the OS to determine if the user is experiencing problems with a particular program function, software application, or OS and quantifies this information as either a widespread instance of difficulty or an isolated instance of difficulty. Client migration proceeds to step 112 to adjust a migration plan if a widespread instance of user difficulty is determined. If users are found to have difficulty in interacting with a migrated system in isolated instances, the client migration process proceeds to step 110 to assist in the planning of additional service offerings, and to modify currently provided service offerings. If user difficulties are not detected, the client migration process terminates in step 108. A pilot process of a modified migration plan is executed until no user difficulties are detected in interacting with a migrated system.

Figure 2A:
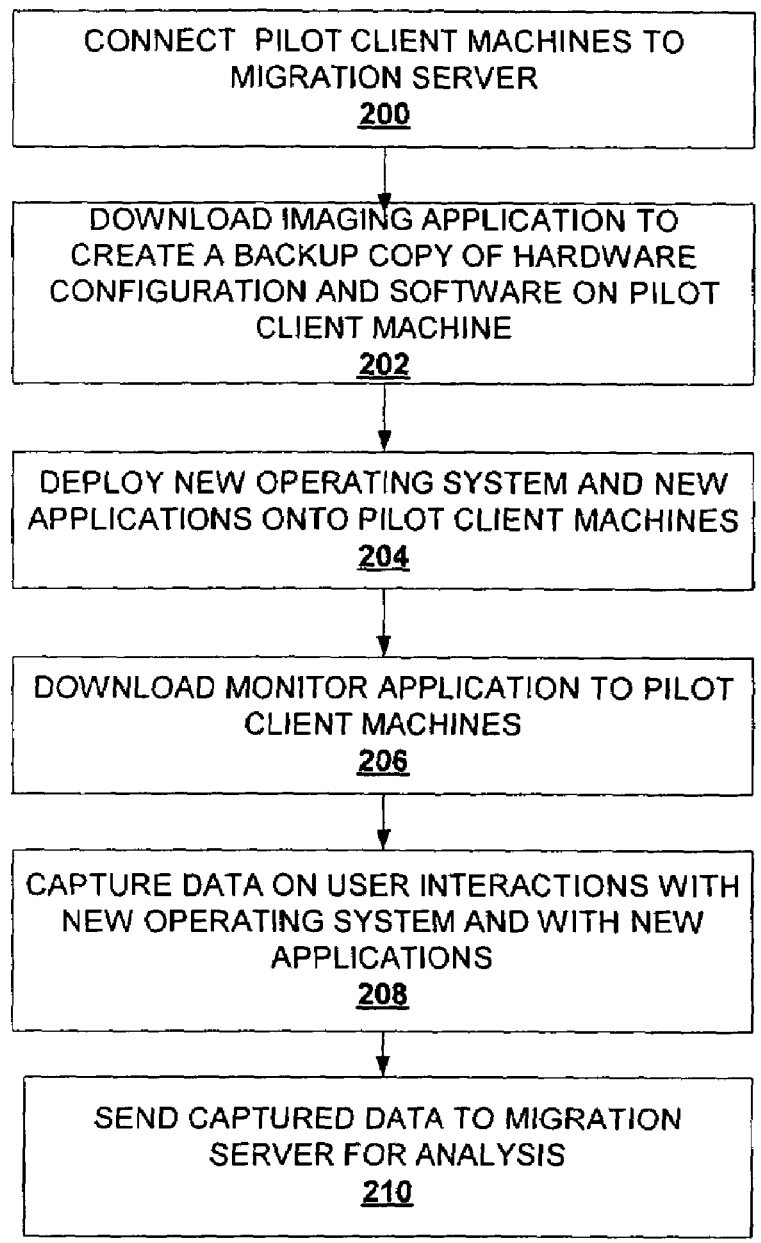
FIG. 2a illustrates a detailed execution of migration plan for the present invention.

Shown in FIG. 2a is a detailed processing plan corresponding to step 106 of FIG. 1. A target set of client machines in an enterprise connects to a website on a migration server in step 200 and downloads an inventory application to each client machine in a target set 202. In one embodiment, a migration plan and an image corresponding to a new software system to be migrated reside on a migration server, accessible via either intranet or Internet. When the downloaded inventory application is run, software components, applications, operating systems, as well as hardware components residing on client machines in the target set are cataloged. Based on the inventory information collected from client machines in the target set, a migration server creates a migration plan. Subsequently in step 204, a migration server executes a pilot process for an initial migration plan by contacting the client machines selected for the pilot and having them connect to a website. Client machines contacted in a pilot process then download an imaging application that creates a backup copy of hardware components and software configuration on a client machine, and a stored image associated with an initial migration plan is copied. In step 206, client machines download a monitor application to collect interaction data between a user and a new OS and associated applications. In step 208, user interaction data are captured and sent at periodic intervals to update a migration server, in step 210.

Figure 2B:
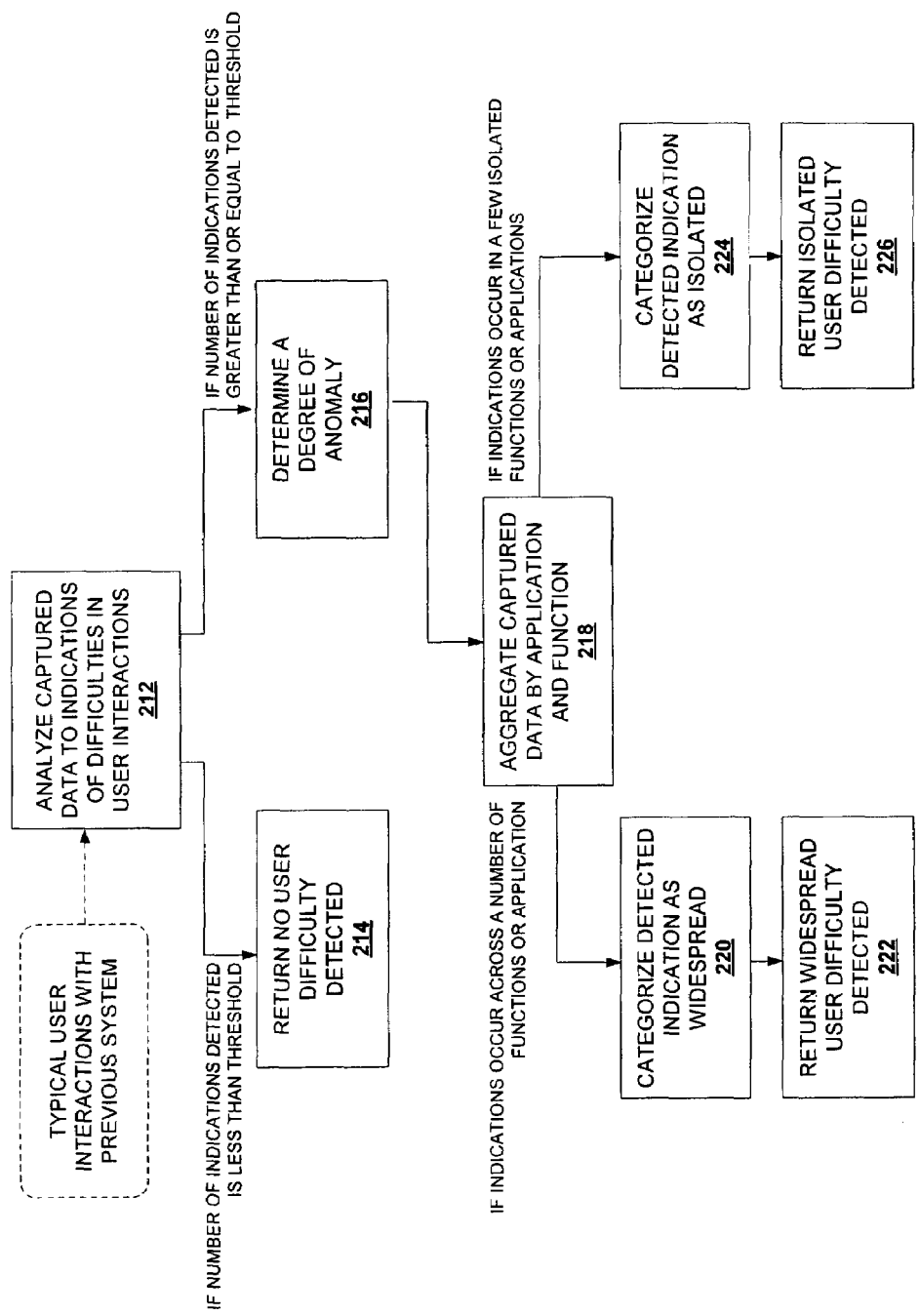
FIG. 2b illustrates a detailed process feedback mechanism.

Referring now to FIG. 2b, captured user interaction data are stored in a database and analyzed in step 212, to detect possible indications and sources of user difficulty. In one embodiment, user difficulty is detected via comparison to typical user interactions with a previous system (i.e., OS, software components, and applications) from a baseline user performance model developed before migration of a new system. For example, a baseline statistic indicating the speed and accuracy with which a user is able to activate a spell-checking function prior to migration is compared with user performance after migration to note significant differences in speed and accuracy measures. In another embodiment, user difficulty is detected via pattern recognition. For example, patterns indicating a user searching through many menu items before finding a desired menu item or using a "help" command frequently are used as indicators of user difficulty.

If the number of user difficulties indicated is less than a pre-determined threshold, feedback process is terminated in step 214. Otherwise, in step 216, a degree of anomaly is determined based on a number of detected patterns or based on a statistic difference between a current and baseline user performance model. Subsequently, in step 218, captured data are aggregated by application and function; specifically, user interaction data corresponding to a particular software application and program feature are collected and categorized. In a first embodiment, if the number of user difficulties detected in step 212 are shown in step 218 to occur across a number of functions or applications, they are categorized in step 220 as a widespread user difficulty, and an indication of widespread user difficulty is returned to the client migration process in step 106. Otherwise if the number of user difficulties detected are shown to occur in a few isolated functions or applications, user difficulty is categorized as isolated in step 224, and an indication of isolated user difficulty is returned in step 226 to the client migration process in step 106. In a second embodiment, a detected difficulty is determined as an isolated incident or a widespread problem by using a heuristic; for example, if 3% or fewer users encounter the same difficulty, it is categorized as isolated, and if more than 3% encounter such a difficulty, then it is categorized as widespread.

Returning now to FIG. 1, feedback determining isolated instances of user difficulty is used to add, modify, or replace service offerings including, but not limited to: online help, training classes, telephone calls from technical support, tailoring a help application to download examples illustrating the solution to a problem, and performing business process re-engineering in step 110. For user difficulties categorized as widespread, in step 112, a migration plan would be adjusted in a manner including, but not limited to: searching for better replacement migration solutions (e.g., different applications, programs); searching for supplementary migration solutions (e.g., additional applications, programs, patches); opting not to perform a migration for a specified subset of applications; and opting not to perform a migration at all. A pilot process of a modified migration plan is executed until no user difficulties are detected in interacting with a migrated system, at which time a migration is performed for all client machines in a target set.

In one embodiment, a technical support group assigned to support migrated client machines on an enterprise is notified of indications of user difficulty by a migration server and proactively contacts the user experiencing difficulty (e.g., via telephone and email) to provide assistance and reach resolution. In another embodiment, indications of user difficulty are organized by a migration server into an online listing of frequently asked questions (FAQ) available for user access. In yet another embodiment, a migration server sends an email directly to users indicating user difficulties and indicating potential solutions. In yet another embodiment, a migration server sends a hyperlink embedded in an email corresponding to a download location for a help application demonstrating a plurality of solutions. Once the pilot process has terminated, the migration server contacts all remaining client machines in a target set of enterprise machines and provides a download location of an improved migration plan. To aid in subsequent migration planning, the migration server analyzes its performance, archives captured data, and generates a final report. Archived data from multiple migrations is subsequently used to improve client migration planning for future engagements.

Additionally, the present invention provides for an article of manufacture comprising computer readable program code contained within implementing one or more modules to refine a migration plan based on automated monitoring, capture, and analysis of user interactions with a migrated client system, in a pilot process. Furthermore, the present invention includes a computer program code-based product, which is a storage medium having program code stored therein which can be used to instruct a computer to perform any of the methods associated with the present invention. The computer storage medium includes any of, but is not limited to, the following: CD-ROM, DVD, magnetic tape, optical disc, hard drive, floppy disk, ferroelectric memory, flash memory, ferromagnetic memory, optical storage, charge coupled devices, magnetic or optical cards, smart cards, EEPROM, EPROM, RAM, ROM, DRAM, SRAM, SDRAM, or any other appropriate static or dynamic memory or data storage devices.

Implemented in computer program code based products are software modules for: (a) automatically monitoring and capturing user interaction data with a migrated system in a pilot process; (b) analyzing captured data with respect to a baseline of expected usage for the migrated system; and (c) deploying an adjusted migration plan in a pilot process.

CONCLUSION

A system and method has been shown in the above embodiments for the effective implementation of an autonomic client migration system for service engagements. While various preferred embodiments have been shown and described, it will be understood that there is no intent to limit the invention by such disclosure, but rather, it is intended to cover all modifications falling within the spirit and scope of the invention, as defined in the appended claims. For example, the present invention should not be limited by software/program, computing environment, or specific computing hardware.

The above enhancements are implemented in various computing environments. For example, the present invention may be implemented on a conventional IBM PC or equivalent, multi-nodal system (e.g., LAN) or networking system (e.g., Internet, WWW, wireless web). All programming and data related thereto are stored in computer memory, static or dynamic. The programming of the present invention may be implemented by one of skill in the art of object-oriented programming.

The invention claimed is:

1. A method of managing a plan for the migration of a new software system; said new software system deployed by migrating said new software system from a migration server to at least one hardware component within an entity; said new software system replacing at least one software component previously installed on said at least one hardware component within an entity, said method comprising:
   a. automatically capturing data reflecting user interactions with said new software system;
   b. analyzing said captured data, with respect to expected user interactions for said new software system, to determine the existence of user difficulty in interacting with said new software system; and
   c. automatically modifying, based on said analysis, current service offerings by customizing existing service offerings and adding new service offerings, said service offerings comprising: online documentation, interactive online training, live interaction with technical support personnel, live training, and business process re-engineering.

2. A method of managing a plan for the migration of a new software system, as per claim 1, wherein said new software system comprises an operating system (OS) and at least one software application.

3. A method of managing a plan for the migration of a new software system, as per claim 1, wherein said analysis comprises: detecting patterns in said captured data that are anomalous with respect to said expected user interactions for said migrated software system.

4. A method of managing a plan for the migration of a new software system, as per claim 3, wherein said analysis further comprises:
 a. determining a qualitative degree of anomaly for said detected pattern;
 b. aggregating said captured data by at least one of software application type and function performed; and
 c. categorizing, based on said aggregation, said detected pattern as either an isolated user difficulty or a widespread user difficulty.

5. A method of managing a plan for the migration of a new software system, as per claim 3, wherein said patterns are detected by any of: counting, organization, or clustering said captured data.

6. A method of managing a plan for the migration of a new software system, as per claim 5, wherein said detected patterns in captured data either: exceed said maximum threshold for time to accomplish said function or do not meet said minimum baseline for accurately performing said sequence of operations.

7. A method of managing a plan for the migration of a new software system, as per claim 3, wherein said expected user interaction is comprised of: a sequence of operations performed by said interacting user to accomplish said function and a statistic indicating both a maximum threshold for time to accomplish said function and a minimum baseline for accurately performing said sequence of operations.

8. A method of managing a plan for the migration of a new software system, as per claim 3, wherein said detected pattern is categorized as a widespread user difficulty if said captured data corresponds to sequences of operations performing at least a specified number of different functions; otherwise, said detected pattern is categorized as an isolated user difficulty.

9. A method of managing a plan for the migration of a new software system, as per claim 3, wherein said detected pattern is categorized as a widespread user difficulty, if said aggregated captured data corresponds to at least a specified number of interacting users; otherwise, said detected pattern is categorized as an isolated user difficulty.

10. A method of managing a plan for the migration of a new software system, as per claim 1, wherein said method is repeated until said analysis results in neither a modification to said service offerings nor a modification to said migration plan.

11. A method of managing a plan for the migration of a new software system, as per claim 1, wherein method further comprises automatically in said migration plan based on said analysis, said modification to migration plan comprises at least one of: replacing said new software system, in either part or totality; adding to said new software system; and opting to provide said new software system in part.

12. A method of managing a plan for the migration of a software system, as per claim 1, wherein said migration comprises:
 a. receiving at said at least one hardware component within an entity, a first application from said migration server;
 b. inventorying, using said first application, said at least one software component previously installed and said at least hardware component;
 c. creating a migration plan, based on results of said inventory; and
 d. executing said migration plan in a pilot process.

13. A method of managing a plan for the migration of a new software system, as per claim 12, wherein said migration plan comprises: components of said new software system to be deployed, images corresponding to said new software system to be deployed, and a timeline associated with deploying said new software system.

14. A method of managing a plan for the migration of a new software system, as per claim 13, wherein said execution of migration plan comprises:
 a. downloading to said at least one hardware component, a second application and a monitor application; said second application creating a backup copy of said at least one software component previously installed on said at least hardware component;
 b. copying said image corresponding to said new software system to said at least one hardware component to replace said at least one software component; and
 c. monitoring said new software system by collection of said user-computer interaction data via said monitor application.

15. A method of managing the migration of a system onto at least one computer within an organization; said migrated system replacing a previously installed system on said at least one computer, said method comprising:
 a. automatically monitoring a user's interactions with said migrated system to detect user difficulties in utilizing said migrated system; said difficulties arising from replacement of said previously installed system;
 b. detecting patterns in said monitored user's interactions that are anomalous with respect to expected user interactions for said migrated system;
 c. determining a qualitative degree of anomaly for said detected pattern;
 d. aggregating said captured data by at least one application type and function performed;
 e. categorizing, based on said aggregation, said detected pattern as either an isolated user difficulty or widespread user difficulty; and
 f. modifying, based on said categorization, a plan designed to facilitate said organization in making better use of said migrated system.

16. A method of managing the migration of a system, as per claim 15, wherein said modification comprises taking corrective action to assist said user in more productively utilizing said migrated system.

17. A method of managing the migration of a system, as per claim 16, wherein said corrective action provides at least one of: customized online help, a list of frequently asked questions, a customized help program, training classes, and interaction with technical support.

18. A method of managing the migration of a system, as per claim 15, wherein said modification comprises altering the configuration of said migrated system.

19. A method of managing the migration of a system, as per claim 18, wherein said alteration of migrated system configuration is at least one of the following: replacing said migrated system, either in part or in totality; providing additional software to said migrated system; and opting not to provide said migrated system, either in part or in totality.

20. A method of managing the migration of a system, as per claim 15, further comprising analyzing said detected user difficulties to determine patterns of difficulties among users utilizing said migrated system.

21. A method of managing the migration of a system, as per claim 20, wherein said patterns are determined by any of: counting, organizing, or clustering said detected user difficulties.

22. A method of managing the migration of a system, as per claim 15, wherein said migrated system comprises an operating system (OS) and at least one software application.

23. A method of managing the migration of a system, as per claim 15, wherein said modification is automated.

24. A system managing the migration and deployment of a new software system; said system comprising:
   a. a migration server storing at least: said new software system and a migration plan;
   b. at least one hardware component within an entity having a previously installed software component receiving, from said migration server, said new software system for replacing said at least one previously installed software component, based on said migration plan;
   c. a capture mechanism, capturing, from said hardware component, data from interaction between a user and said new software system; and
   d. a processing mechanism for analyzing of said captured interaction data; said processing mechanism providing modifications to service offerings based on said analysis by customizing existing service offerings and adding new service offerings, said service offerings comprising: online documentation, interactive online training, live interaction with technical support personnel, live training, and business process re-engineering.

25. A system managing the migration and deployment of a new software system, as per claim 24, wherein said new software system comprises an operating system (OS) and a software application.

26. A system managing the migration and deployment of a new software system, as per claim 24, wherein said analysis comprises detecting patterns in said captured interaction data that are anomalous with respect to said expected user interactions for said migrated software system.

27. A system managing the migration and deployment of a new software system, as per claim 24, wherein said modification comprises at least one of: replacing said new software system, in either part or totality; adding to said new software system; and opting to provide said new software system in part.

28. An article of manufacture comprising a computer usable medium having computer readable program code embodied therein which implements the management of a plan for the migration of a new software system; said new software system deployed by migrating said new software system from a migration server to at least one hardware component within an entity; said new software system replacing at least one software component previously installed on said at least one hardware component within an entity; said medium comprising modules:
   a. automatically capturing data reflecting user interactions with said new software system;
   b. analyzing said captured data, with respect to expected user interactions for said new software system, to determine the existence of user difficulty in interacting with said new software system; and
   c. automatically modifying, based on said analysis, current service offerings by customizing existing service offerings and adding new service offerings, said service offerings comprising: online documentation, interactive online training, live interaction with technical support personnel, live training, and business process re-engineering.

29. An article of manufacture comprising a computer usable medium, as per claim 28, wherein said new software system comprises an operating system (OS) and at least one software application.

30. An article of manufacture comprising a computer usable medium, as per claim 28, wherein said analysis comprises: detecting patterns in said captured data that are anomalous with respect to said expected user interactions for said migrated software system.

31. An article of manufacture comprising a computer usable medium, as per claim 30, wherein said analysis further comprises:
   a. determining a qualitative degree of anomaly for said detected pattern;
   b. aggregating said captured data by at least one of software application type and function performed; and
   c. categorizing, based on said aggregation, said detected pattern as either an isolated user difficulty or a widespread user difficulty.

32. An article of manufacture comprising a computer usable medium, as per claim 30, wherein said expected user interaction is comprised of: a sequence of operations performed by said interacting user to accomplish said function and a statistic indicating both a maximum threshold for time to accomplish said function and a minimum baseline for accurately performing said sequence of operations.

33. An article of manufacture comprising a computer usable medium, as per claim 30, wherein said detected pattern is categorized as a widespread user difficulty if said captured data corresponds to sequences of operations performing at least a specified number of different functions; otherwise, said detected pattern is categorized as an isolated user difficulty.

34. An article of manufacture comprising a computer usable medium, as per claim 30, wherein said detected pattern is categorized as a widespread user difficulty, if said aggregated captured data corresponds to at least a specified number of interacting users; otherwise, said detected pattern is categorized as an isolated user difficulty.

35. An article of manufacture comprising a computer usable medium, as per claim 34, wherein said detected patterns in captured data either: exceed said maximum threshold for time to accomplish said function or do not meet said minimum baseline for accurately performing said sequence of operations.

36. An article of manufacture comprising a computer usable medium, as per claim 28, wherein said method is repeated until said analysis results in neither a modification to said service offerings nor a modification to said migration plan.

37. An article of manufacture comprising a computer usable medium, as per claim 28, wherein said medium further comprises computer readable program code automatically modifying said migration plan based on said analysis, said modification to migration plan comprises at least one of: replacing said new software system, in either part or totality; adding to said new software system; and opting to provide said new software system in part.

38. An article of manufacture comprising a computer usable medium, as per claim 28, wherein said migration comprises:
   d. receiving at said at least one hardware component within an entity, a first application from said migration server;

e. inventorying, using said first application, said at least one software component previously installed and said at least hardware component;
f. creating a migration plan, based on results of said inventory; and
g. executing said migration plan in a pilot process.

39. An article of manufacture comprising a computer usable medium, as per claim 38, wherein said migration plan comprises: components of said new software system to be deployed, images corresponding to said new software system to be deployed, and a timeline associated with deploying said new software system.

40. An article of manufacture comprising a computer usable medium, as per claim 38, wherein said execution of migration plan comprises:
  a. downloading to said at least one hardware component, a second application and a monitor application; said second application creating a backup copy of said at least one software component previously installed on said at least hardware component;
  b. copying said image corresponding to said new software system to said at least one hardware component to replace said at least one software component; and
  c. monitoring said new software system by collection of said user-computer interaction data via said monitor application.

41. A method of efficiently managing, as a business service, the migration and deployment of a new software system; said method comprising:
  a. automatically capturing data reflecting user interactions with said new software system;
  b. analyzing said captured data with respect to expected user interactions for said new software system; and
  c. providing at least one of: a modification to said migration plan and a customized, corrective modification to a plurality of service offerings, based on said analysis, wherein said provision is enabled as service to an administrator, if a modification is made, and wherein said provision is enabled as a service to a user, if customized corrective action is taken.

42. A method of managing a plan for the migration of a new software system, as per claim 41, wherein said analysis further comprises: determining a qualitative degree of anomaly for said captured data with respect to expected user interactions; aggregating said captured data by at least one of software application type and function performed; and categorizing, based on said aggregation, said captured data as either an isolated user difficulty or a widespread user difficulty.

43. A method of managing a plan for the migration of a new software system, as per claim 41, wherein said analysis comprises: detecting patterns in said captured data that are anomalous with respect to said expected user interactions for said migrated software system.

44. A method of managing a plan for the migration of a new software system, as per claim 41, wherein said modification to migration plan comprises at least one of: replacing said new software system, in either part or totality; adding to said new software system; and opting to provide said new software system in part.

45. A method of managing a plan for the migration of a new software system, as per claim 41, wherein said modification to service offerings is comprised of customizing existing service offerings and adding new service offerings; said service offerings comprising: online documentation, interactive online training, live interaction with technical support personnel, live training, and business process re-engineering.

46. A method for improving migration planning and deployment of a new software system, as a business service; said method comprising:
  a. automatically capturing data reflecting user interactions with said new software system;
  b. analyzing said captured data with respect to expected user interactions for said migrated software system;
  c. providing at least one of: a modification to said migration plan and a customized, corrective modification to a plurality of service offerings, based on said analysis; and
  d. archiving at least one of said: captured data, analysis of captured data, modification to said migration plan, and customized, corrective modification to said plurality of service offerings, in an archive server; wherein said archive is consulted to create subsequent migration plans.

* * * * *